US011741821B2

(12) United States Patent
Buck, Jr. et al.

(10) Patent No.: US 11,741,821 B2
(45) Date of Patent: *Aug. 29, 2023

(54) SYSTEMS AND METHODS FOR SEMI-AUTONOMOUS INDIVIDUAL MONITORING

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(73) Assignee: BI Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,711

(22) Filed: Oct. 6, 2021

(65) Prior Publication Data
US 2022/0028250 A1    Jan. 27, 2022

Related U.S. Application Data

(60) Continuation of application No. 16/937,215, filed on Jul. 23, 2020, now Pat. No. 11,164,445, which is a
(Continued)

(51) Int. Cl.
| | |
|---|---|
| *G08B 25/01* | (2006.01) |
| *G08B 21/22* | (2006.01) |
| *H04W 4/029* | (2018.01) |
| *H04L 67/75* | (2022.01) |
| *H04L 67/50* | (2022.01) |
| *G06Q 50/26* | (2012.01) |
| *G08B 21/24* | (2006.01) |
| *G08B 25/10* | (2006.01) |
| *G01C 21/34* | (2006.01) |
| *G01S 5/00* | (2006.01) |

(Continued)

(52) U.S. Cl.
CPC ....... *G08B 25/016* (2013.01); *G01C 21/3461* (2013.01); *G01S 5/0027* (2013.01); *G06F 1/3212* (2013.01); *G06F 1/3296* (2013.01); *G06Q 50/26* (2013.01); *G08B 21/0258* (2013.01); *G08B 21/0269* (2013.01); *G08B 21/0288* (2013.01); *G08B 21/182* (2013.01); *G08B 21/22* (2013.01); *G08B 21/24* (2013.01); *G08B 25/10* (2013.01); *H04L 67/535* (2022.05); *H04L 67/75* (2022.05); *H04W 4/021* (2013.01); *H04W 4/029* (2018.02); *H04W 52/028* (2013.01); *H04W 52/0277* (2013.01); *G01S 2205/002* (2013.01); *G01S 2205/008* (2013.01)

(58) Field of Classification Search
CPC .......................... G01S 5/0027; G07C 9/00111
See application file for complete search history.

(56) References Cited

U.S. PATENT DOCUMENTS

| | | |
|---|---|---|
| 4,724,427 A | 2/1988 | Carrol |
| 5,731,757 A | 3/1998 | Layson |
| (Continued) | | |

FOREIGN PATENT DOCUMENTS

| | | |
|---|---|---|
| WO | WO/1998/08204 | 2/1998 |
| WO | WO/2000/077688 | 12/2000 |

*Primary Examiner* — Fabricio R Murillo Garcia
(74) *Attorney, Agent, or Firm* — HDC Intellectual Property Law, LLP

(57) ABSTRACT

Various embodiments provide systems and method for monitoring individuals.

15 Claims, 7 Drawing Sheets

Related U.S. Application Data division of application No. 16/221,493, filed on Dec. 15, 2018, now Pat. No. 10,769,932.

(60) Provisional application No. 62/612,650, filed on Jan. 1, 2018.

(51) Int. Cl.
| | |
|---|---|
| *G06F 1/3212* | (2019.01) |
| *G06F 1/3296* | (2019.01) |
| *G08B 21/18* | (2006.01) |
| *H04W 52/02* | (2009.01) |
| *G08B 21/02* | (2006.01) |
| *H04W 4/021* | (2018.01) |

(56) References Cited

U.S. PATENT DOCUMENTS

| | | | |
|---|---|---|---|
| 6,130,620 A | 10/2000 | Pinnow | |
| 6,169,484 B1 | 1/2001 | Schuman | |
| 6,323,773 B1 | 11/2001 | Runyon | |
| 6,393,362 B1 | 5/2002 | Burns | |
| 7,015,817 B2 | 3/2006 | Copley | |
| 7,619,533 B2 | 11/2009 | Crucilla | |
| 7,886,648 B2 | 2/2011 | Williams | |
| 7,905,832 B1 | 3/2011 | Lau | |
| 7,930,927 B2 | 4/2011 | Cooper | |
| 8,352,111 B2 | 1/2013 | Mudalige | |
| 8,493,219 B2 | 7/2013 | Buck | |
| 8,576,065 B2 | 11/2013 | Buck | |
| 8,629,776 B2 | 1/2014 | Buck | |
| 8,952,805 B2 | 2/2015 | Baines et al. | |
| 9,240,118 B2 | 1/2016 | Melton | |
| 9,355,548 B2 | 5/2016 | Buck | |
| 9,423,487 B2 | 8/2016 | Buck | |
| 9,629,420 B2 | 4/2017 | Cooper | |
| 9,668,095 B1 | 5/2017 | Newell | |
| 9,989,649 B2 | 6/2018 | Buck | |
| 10,068,462 B2 | 9/2018 | Buck, Jr. | |
| 2003/0222781 A1 | 12/2003 | Defant et al. | |
| 2005/0040944 A1 | 2/2005 | Contestabile | |
| 2007/0014264 A1 | 1/2007 | Davis | |
| 2007/0285258 A1* | 12/2007 | Hartman | G08B 21/22 340/568.1 |
| 2008/0012760 A1 | 1/2008 | Derrick | |
| 2008/0018459 A1 | 1/2008 | Derrick | |
| 2011/0154887 A1 | 6/2011 | Cooper | |
| 2011/0195722 A1* | 8/2011 | Walter | G01S 5/017 455/456.1 |
| 2011/0199205 A1 | 8/2011 | Kremi | |
| 2011/0237726 A1 | 9/2011 | Dhuna | |
| 2013/0328678 A1 | 12/2013 | Shechtner | |
| 2014/0039804 A1 | 2/2014 | Park | |
| 2014/0179342 A1 | 6/2014 | Hamerly | |
| 2015/0123766 A1 | 5/2015 | St. John | |
| 2015/0356261 A1 | 12/2015 | Brust | |
| 2016/0081587 A1* | 3/2016 | Ghazarian | G06V 20/59 600/301 |
| 2016/0154643 A1 | 6/2016 | Zhang | |
| 2016/0267770 A1 | 9/2016 | Keays | |
| 2016/0301581 A1 | 10/2016 | Carter | |
| 2017/0134249 A1 | 5/2017 | Laing | |
| 2017/0303090 A1 | 10/2017 | Stitt | |
| 2017/0307388 A1 | 10/2017 | McConathy | |
| 2018/0224517 A1 | 8/2018 | Ingerson | |
| 2019/0043285 A1* | 2/2019 | Hodge | G08B 21/0261 |

\* cited by examiner

SYSTEMS AND METHODS FOR SEMI-AUTONOMOUS INDIVIDUAL MONITORING

CROSS REFERENCE TO RELATED APPLICATION

The present application is a continuation of U.S. patent application Ser. No. 16/937,215 entitled "Systems and Methods for Semi-Autonomous Individual Monitoring" and filed Jul. 23, 2020 by Buck et al.; which in turn is a divisional of U.S. patent application Ser. No. 16/221,493 entitled "Systems and Methods for Semi-Autonomous Individual Monitoring" and filed Dec. 15, 2018 by Buck et al.; which in turn claims priority to (i.e., is a non-provisional of) U.S. Pat. App. No. 62/612,650 entitled "Systems and Methods for Monitoring Individuals", and filed Jan. 1, 2018 by Buck et al. The entirety of the aforementioned applications are incorporated herein by reference for all purposes.

BACKGROUND OF THE INVENTION

Various embodiments provide systems and method for semi-autonomous monitoring of individuals.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward. In many monitoring systems, the lack of sufficient mobile power limits the ability of a monitoring agency to know the movement details of a tracked individual.

Thus, for at least the aforementioned reasons, there exists a need in the art for more advanced approaches, devices and systems for monitoring.

BRIEF SUMMARY OF THE INVENTION

Various embodiments provide systems and method for semi-autonomous monitoring of individuals.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
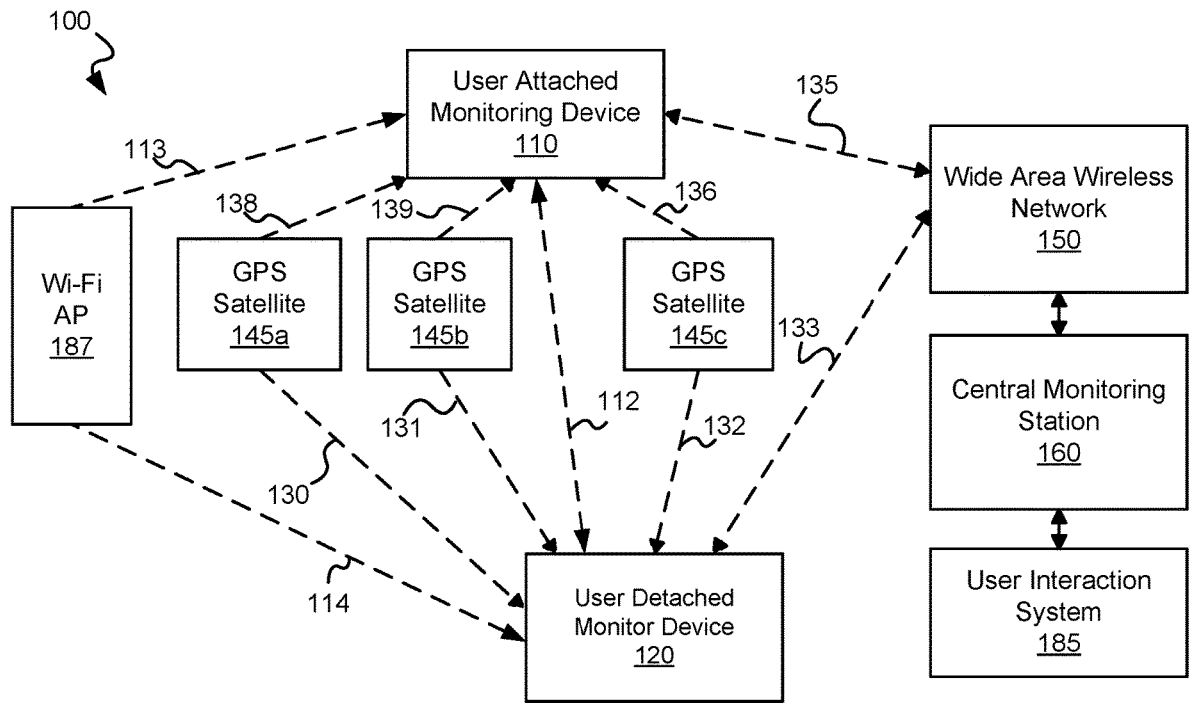
FIG. 1a is a block diagram illustrating a hybrid monitoring system including both a user attached monitor device and a user detached monitor device in accordance with various embodiments.

Various embodiments provide systems and method for monitoring individuals.

It has been found that returning offenders to society after being locked up in a secure facility with little if any control of their day to day activities is often unsuccessful. It is often helpful to have, for example, a parole officer monitor their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provides tools and devices that continue to support the individual as they transition away from the active oversight by, for example, a parole officer.

Some embodiments provide monitoring systems that have a monitoring station. The monitoring station includes: a communication apparatus configured to communicate with both a user detached monitor via a first communication link and a user attached monitor via a second communication link and a computer readable medium. Both the user detached monitor and the user attached monitor are associated with an individual being monitored is associated. The computer readable medium includes instructions executable by a processor to: identify a conflict with an original check-in schedule; generate a modified check-in schedule by modifying the original check-in schedule in an aspect related to the conflict; upload the modified check-in schedule to a combination of the user detached monitor and the user attached monitor; receive check-in information from at least one of the user detached monitor or the user attached monitor; and determine if the check-in information complies with the check-in schedule.

In some instances of the aforementioned embodiments, the computer readable medium further includes instructions executable by the processor to receive one or more check-in windows associated with two or more check-in times in the original check-in schedule. Identifying the conflict with the original check-in schedule includes: determining that an end of a check-in window for a first check-in time is within a defined time period of a beginning of a check-in window for a second check-in time, and indicating the conflict. Modifying the original check-in schedule in an aspect related to the conflict includes one or more of: removing one of the first check-in time or the second check-in time from the original check-in schedule, reducing the check-in window of the first check-in time in the original check-in schedule, or reducing the check-in window of the second check-in time in the original check-in schedule.

In various instances of the aforementioned embodiments, the system includes the user detached monitor, and the instructions that identify the conflict with the original check-in schedule includes instructions executable by the processor to: access an individual schedule from the user detached monitor; compare the individual schedule with the original check-in schedule, wherein the conflict is found where it is determined that an event in the individual schedule overlaps an event in the original check-in schedule; and modifying the original check-in schedule in the aspect related to the conflict includes removing the check-in time corresponding to the conflict to yield the modified check-in schedule as the check-in schedule without the check-in time corresponding to the conflict. In some cases, the communication apparatus is a first communication apparatus, the processor is a first processor, the computer readable medium is a first computer readable medium, and the user detached monitor includes: a second a communication apparatus operable to receive the modified check-in schedule from the monitoring station; and a second computer readable medium. The second computer readable medium includes instructions executable by a second processor to: alert the individual being monitored of a check-in requirement at a time designated by the modified check-in schedule; receive input from the individual being monitored via one or more sensors of the user detached monitor; and upload at least a portion of the input received from the individual being monitored to the monitoring station. In certain cases, the second computer readable medium further includes instructions executable by the second processor to enable the one or more sensors of the user detached monitor.

In one or more instances of the aforementioned embodiments, the communication apparatus is a first communication apparatus, the processor is a first processor, the computer readable medium is a first computer readable medium, and the user detached monitor includes: a second communication apparatus operable to receive at least a portion of the check-in schedule where the portion of the check-in schedule includes the check-in time corresponding to the conflict, and a second computer readable medium. The second computer readable medium includes instructions executable by a second processor to: receive a request for the individual schedule from the monitoring station; provide the individual schedule to the monitoring station in response to the request; alert the individual being monitored of a check-in requirement at a time designated by the portion of the modified check-in schedule; receive input from the individual being monitored via one or more sensors of the user detached monitor; and upload at least a portion of the input received from the individual being monitored to the monitoring station.

In various instances of the aforementioned embodiments, the monitoring system further includes the user attached monitor, and the user attached monitor includes: an attachment element configured to attach to a limb of an individual being monitored, a tamper sensor configured to indicate removal of the user attached monitor from the individual being monitored, and a communication circuit. The communication circuit is operable to: receive a portion of the modified check-in schedule including the check-in time corresponding to the conflict; and provide status to the monitoring station without interaction with the individual being monitored in accordance with the portion of the modified check-in schedule.

In one or more instances of the aforementioned embodiments, the first communication link and the second communication link are cellular telephone networks. In various instances of the aforementioned embodiments, uploading the modified check-in schedule to the combination of the user detached monitor and the user attached monitor includes an upload process selected from a group consisting of: uploading the modified check-in schedule only to the user detached monitor; uploading the modified check-in schedule only to the user attached monitor; and uploading a first portion of the modified check-in schedule to the user attached monitor and uploading a second portion of the modified check-in schedule to the user detached monitor.

Other embodiments provide monitoring systems that include a user detached monitor. The user detached monitor includes: a sensor configured to receive input from the individual being monitored; a communication apparatus operable to receive at least a portion of an implemented check-in schedule from a monitoring station via a wireless communication network, a processor, and a computer readable medium including instructions executable by the processor. The implemented check-in schedule includes: at least one check-in window and a corresponding check-in time, and a check-in instruction indicating the check-in time and an action to be performed in relation to the sensor. The computer readable medium includes instructions executable by the processor to: alert the individual being monitored of a check-in requirement in accordance with the portion of the implemented check-in schedule; enable the sensor; receive input from the sensor; and upload the input received from the sensor to the monitoring station. In some cases, the wireless communication network is a cellular telephone network.

In various instances of the aforementioned embodiments, the communication apparatus is a first communication apparatus, the computer readable medium is a first computer readable medium, the processor is a first processor, and the monitoring system further includes the monitoring station. The monitoring station includes: a second communication apparatus configured to communicate with the user detached monitor via a communication link, and a second computer readable medium. The second computer readable medium including instructions executable by a second processor to: receive an original check-in schedule for the individual being monitored; identify a conflict with the original check-in schedule; modify the original check-in schedule to change an aspect of the original check-in schedule in an aspect related to the conflict to yield the implemented check-in schedule; upload at least the portion of the implemented check-in schedule to the user detached monitor; receive check-in information from the user detached monitor; and determine if the check-in information complies with the portion of the implemented check-in schedule. In some cases, the second computer readable medium further includes instructions executable by the second processor to receive one or more check-in windows associated with two or more check-in times in the original check-in schedule. In such cases, identifying the conflict with the check-in schedule includes: determining that an end of a check-in window for a first check-in time is within a defined time period of a beginning of a check-in window for a second check-in time; and indicating the conflict. Modifying the original check-in schedule to change an aspect of the original check-in schedule in an aspect related to the conflict includes one or more of: removing one of the first check-in time or the second check-in time from the check-in schedule, reducing the check-in window of the first check-in time in the check-in schedule, or reducing the check-in window of the second check-in time in the check-in schedule.

In some instances of the aforementioned embodiments, the instructions that identify the conflict with the original check-in schedule includes instructions executable by the second processor to: access an individual schedule from the user detached monitor; and compare the individual schedule with the original check-in schedule, where the conflict is found where it is determined that an event in the individual schedule overlaps an event in the original check-in schedule. Modifying the original check-in schedule to change an aspect of the original check-in schedule related to the conflict includes removing the check-in time corresponding to the conflict to yield the implemented check-in schedule.

In various instances of the aforementioned embodiments, the first computer readable medium further includes instructions executable by the first processor to: receive a request for the individual schedule from the monitoring station; and provide the individual schedule to the monitoring station in response to the request. In one or more instances of the aforementioned embodiments, the monitoring system further includes a user attached monitor. The user attached monitor includes: an attachment element configured to attach to a limb of an individual being monitored; a tamper sensor configured to indicate removal of the user attached monitor from the individual being monitored; and a communication circuit. The communication circuit is operable to: receive a portion of the implemented check-in schedule including the check-in time corresponding to the conflict; and provide status to the monitoring station without interaction with the individual being monitored in accordance with the portion of the implemented check-in schedule. In certain instances of the aforementioned embodiments, the sensor is selected from a group consisting of: a camera, an audio sensor; a temperature sensor, and a biometric sensor. In various instances of the aforementioned embodiments, the sensor is a biometric sensor. Such a biometric sensor may be, but is not limited to, a finger print sensor, and/or a retinal scan sensor.

Yet other embodiments provide monitoring systems that include a monitoring station and a user detached monitor. The monitoring station includes: a first communication apparatus configured to communicate with a user detached monitor associated with an individual being monitored via a cellular telephone network; and a first computer readable medium. The first computer readable medium includes instructions executable by a first processor to: receive an original check-in schedule for the individual being monitored, where the original check-in schedule includes at least a first check-in time and a first check-in window corresponding to the first check-in time, and a second check-in time and a second check-in window corresponding to a second check-in time; identify an internal conflict within the original check-in schedule, where the conflict occurs where an end of the first check-in window is within a defined time period of a beginning of the second check-in window; and modify the original check-in schedule. Modifying the original check-in schedule includes performing at least one of the following functions to yield an implemented check-in schedule: removing one of the first check-in time or the second check-in time from the check-in schedule; reducing the check-in window of the first check-in time in the check-in schedule; or reducing the check-in window of the second check-in time in the check-in schedule. The first computer readable medium includes instructions executable by a first processor to upload at least the portion of the implemented check-in schedule to the user detached monitor. The user detached monitor includes: a sensor configured to receive input from the individual being monitored; a second communication apparatus operable to receive at least a portion of an implemented check-in schedule from the monitoring station via the cellular telephone network; and a second computer readable medium. The second computer readable medium includes instructions executable by the second processor to: alert the individual being monitored of a check-in requirement in accordance with the portion of the implemented check-in schedule; receive input from the sensor; and upload the input received from the sensor to the monitoring station as check-in information.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a BlueTooth™ communication link. In other examples, local communication link 112 may be a line of sight infared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wide area wireless (e.g., cellular telephone network, Internet via a Wi-Fi access point, or the like) communication networks 150.

User detached monitor device 120 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145*a*, 145*b*, 145*c* via respective communication links 130, 131, 132. The aforementioned location data is utilized verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 114.

Central monitoring station 160 preferably comprises a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS satellites 145*a*, 145*b*, 145*c* via respective communication links 136, 138, 139. The aforementioned location data is utilized to verify the location of a user associated with user attached monitor device 110 at various points as more fully discussed below. User attached monitor device 110 is considered "non-ambiguous" because it is physically attached to the user in a tamper resistant way and as such provides information only about the user to which it is attached.

The location data and/or other data gathered by user attached monitor device 110 is wirelessly transmitted to central monitoring station 160 via a wide area wireless network 150 accessed via a wireless link 135. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
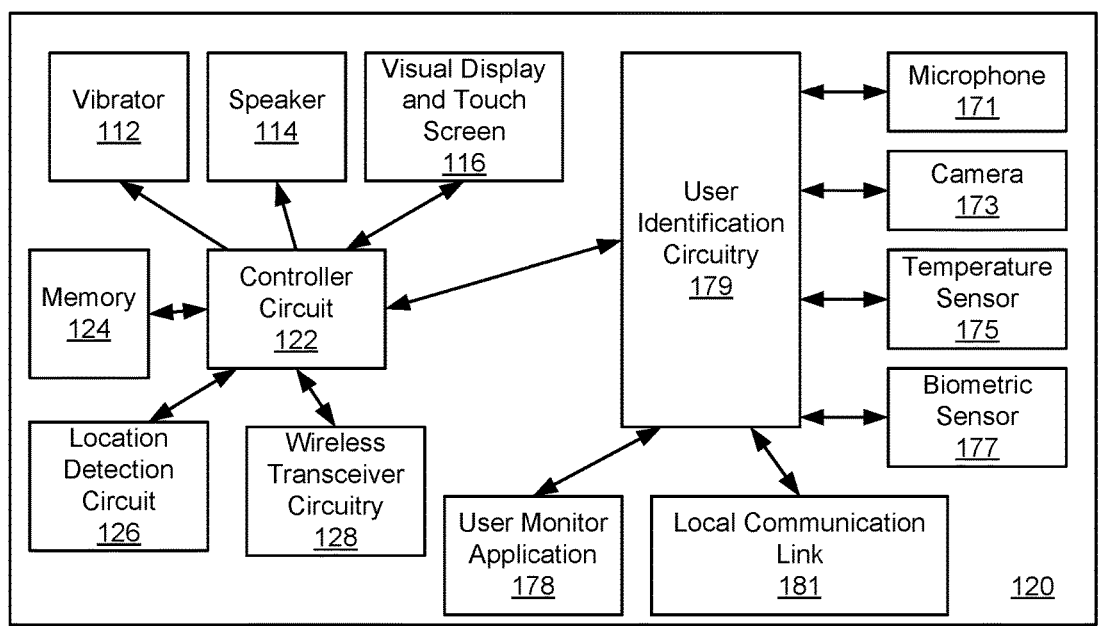
FIG. 1b is a block diagram of a user detached monitor device usable in accordance with one or more embodiments.

Turning to FIG. 1b, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software of firmware based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128.

User detached monitor device 120 additionally includes location circuitry 126. Location circuitry 126 may include one or more of, a GPS processing circuit capable of fixing a location of user detached monitor device 120 using GPS data, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a BlueTooth™ communication protocol and is capable of both receiving information from user attached monitor device 110 and transmitting information to user attached monitor device 110. In other embodiments, Local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

Figure 1C:
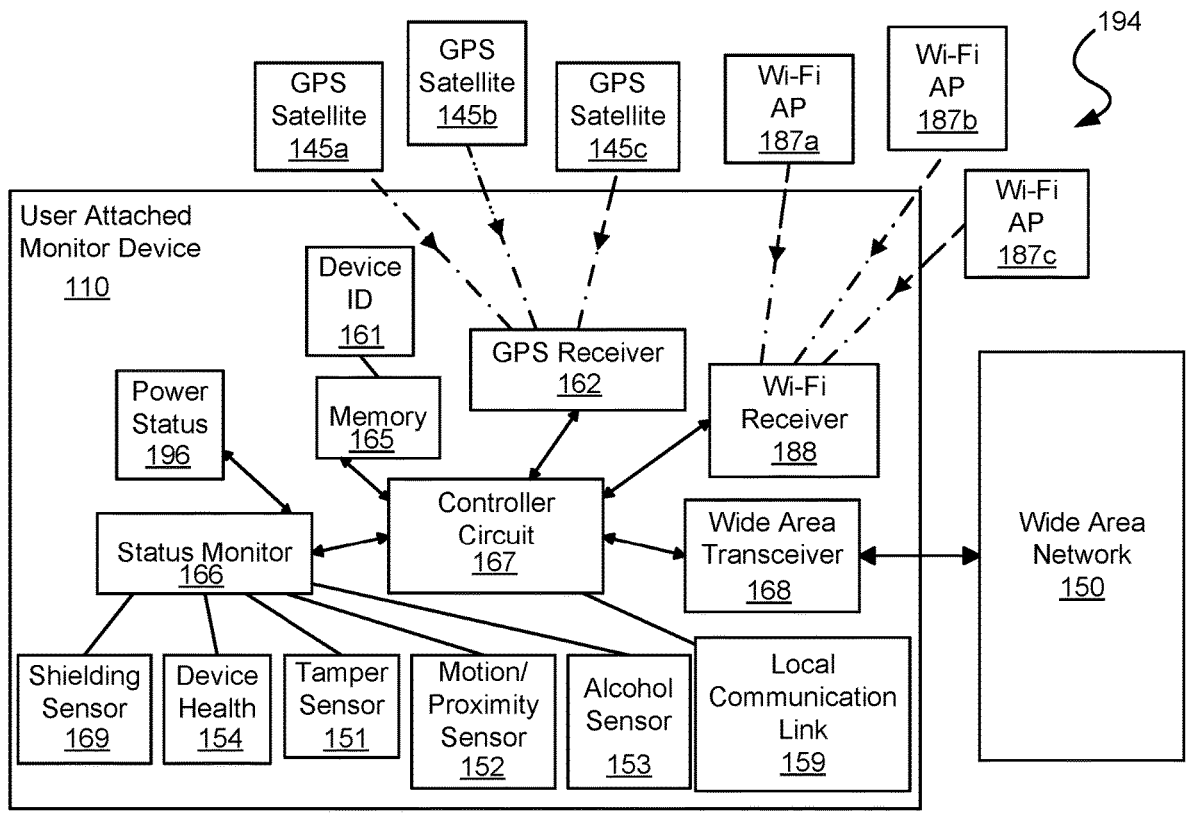
FIG. 1c is a block diagram of a user attached monitor device including a local communication link in accordance with some embodiments.

Turning to FIG. 1c, a block diagram 194 of user attached monitor device 110 including a local communication link 159 in accordance with some embodiments. Local communication link 159 controls communication between user attached monitor device 110 and user detached monitor device 120. In some embodiments, local communication link 159 supports a BlueTooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 110 and transmitting information to user detached monitor device 110. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and thus is accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware based instructions) executable by controller circuit 167 to perform and/or enable various functions associated with user attached monitor device 110. As user attached monitor device 110 comes within range of one or more Wi-Fi access points (e.g., Wi-Fi access points 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a cellular transceiver 168 and a wide area communication network 150 in accordance with a first time period. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from a central monitor system (not shown), or based upon scenarios. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third party service provider resolve the location information. When a maximum number of resolution requests have been issued, the Wi-Fi position determination technology may be disabled. Further, it may be determined the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as cell tower triangulation or GPS may be used.

Controller circuit 167 of user attached monitor device 110 at times functions in conjunction with cellular transceiver 168 to send and receive data and signals through wide area communication network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
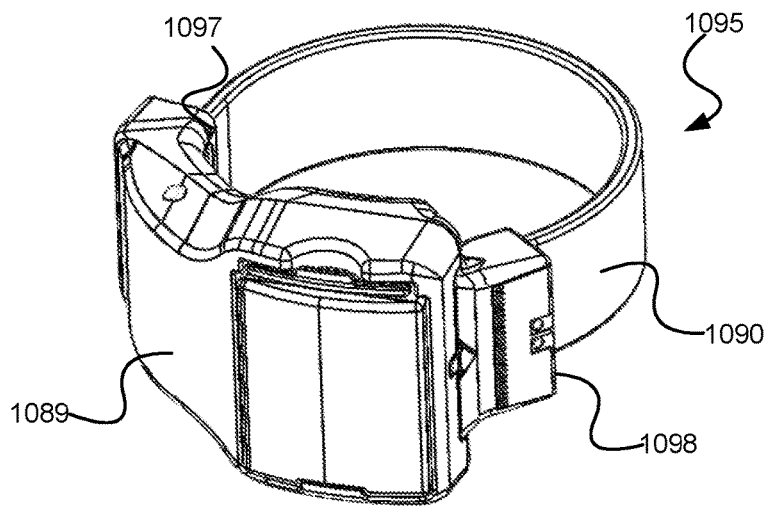
FIG. 1d shows a user attached monitor device with an attachment element for attaching the user attached monitor device to a limb of an individual in accordance with some embodiments.

Turning to FIG. 1*d*, a user attached monitor device 1089 is shown with an example attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments. In various embodiments, attachment element 1090 includes electrically and/or optically conductive material used to make a conductive connection form first end 1097 to second end 1098 through attachment element 1090 and is used in relation to determining whether user attached monitor device 1089 remains attached and/or has been tampered with. While FIG. 1*d* shows a strap as an example attachment element, based upon the disclosure provided herein, one of ordinary skill in the art will recognize other types of attachment elements that may be used in relation to different embodiments.

Figure 2:
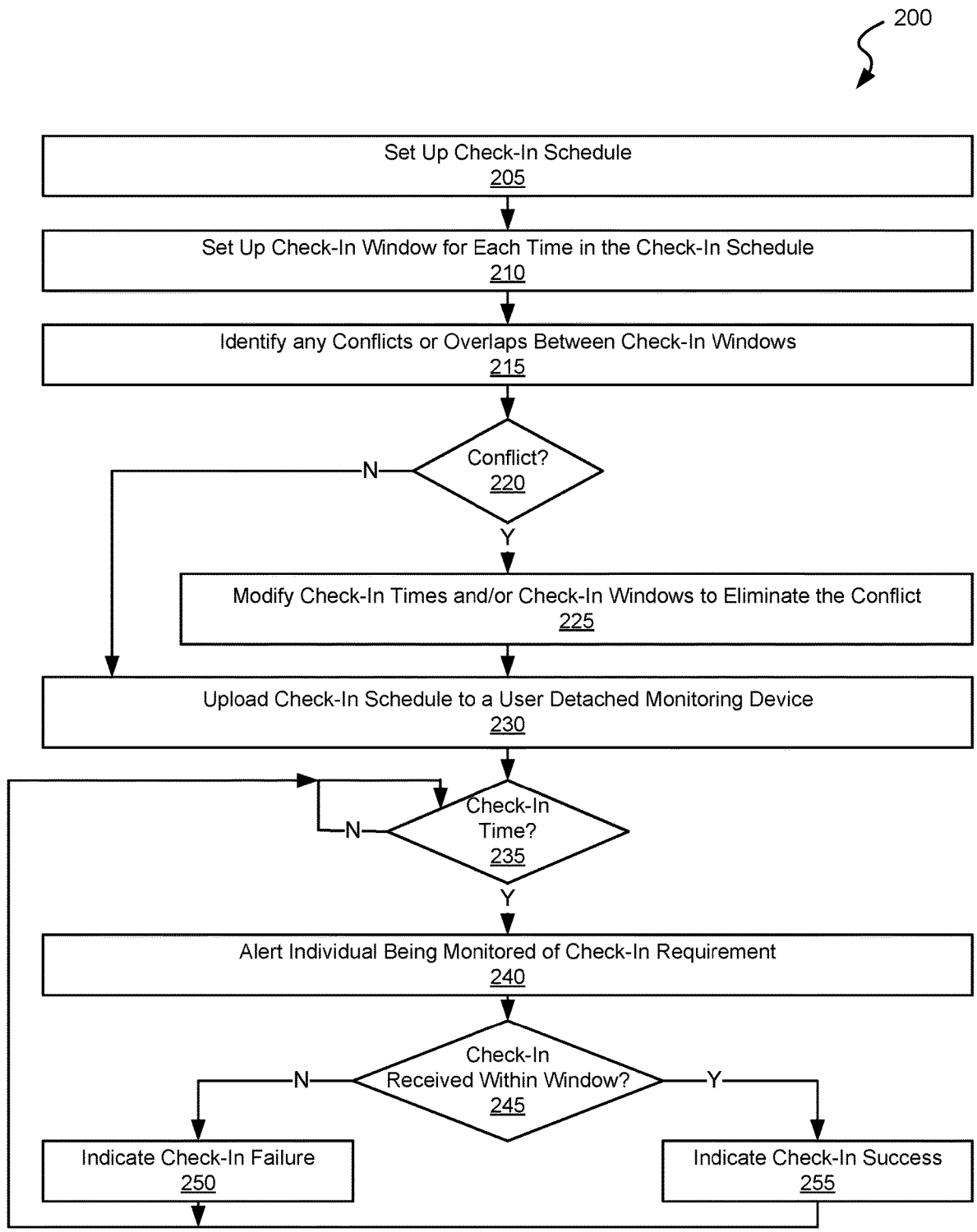
FIG. 2 is a flow diagram showing a method in accordance with some embodiments for interaction between a user detached monitoring device and a remote monitoring station including scheduling and check-in processes.

Turning to FIG. 2, a flow diagram 200 shows a method for interaction between a user detached monitoring device and a remote monitoring station including scheduling and check-in processes in accordance with some embodiments. This method may be used in relation to a user detached monitor device, a user attached monitor device, or a combination of a user attached monitor device and a user detached monitor device. Such a user detached monitor device may be, for example, similar to the user detached monitor device discussed above in relation to FIG. 1*b*. As another example, the user detached monitor device may be a mobile phone including one or more applications allowing operation of the method. Based upon the disclosure provided herein, one of ordinary skill in the art will recognize a variety of user detached monitor devices that may be used in relation to different embodiments. The user attached monitor device may be, for example, similar to the user detached monitor device discussed above in relation to FIG. 1*c*. Based upon the disclosure provided herein, one of ordinary skill in the art will recognize a variety of user attached monitor devices that may be used in relation to different embodiments. The monitor may be any individual or automated machine capable of setting a schedule for an individual subject to the monitoring. As one example, a monitor may be a parole officer. Based upon the disclosure provided herein, one of ordinary skill in the art will recognize a variety of monitors that may operate in relation to different embodiments.

Following flow diagram 200, a check-in schedule is set up by a monitor accessing the system via a user interaction device (block 205). Such a user interaction device may be, but is not limited to, a network connected user interface device communicatively coupled via a network to a remote monitoring system and/or directly to a user detached monitor device via a wireless communication network. As just some examples, the user interaction device may be a mobile phone, a mobile computer, or a fixed computer station. Based upon the disclosure provided herein one of ordinary skill in the art will recognize a variety of user interaction devices that may be used in relation to different embodiments.

The check-in schedule may consist of predetermined check-in periods, random check-in periods, and/or on-demand check-in periods. The monitor sets a predetermined check-in period by selecting a single date/time option for the check-in to occur. The monitor may set multiple predetermined check-in periods by selecting a plurality of single dates/times for the check-in to occur. The monitor sets a random check-in period by selecting a continuous range of date/time options that reflect the temporal bounds within which the monitor desires the check-in to randomly occur, and additionally selects the number of check-ins the monitor desires to be taken during the random check-in period. As the selection consists of a range that may be resized or otherwise tailored according to the preference of the monitor. The server system then randomly schedules the desired number of check-in to occur during the set random check-in period. Preferably, if the generated schedule is a periodic schedule (e.g. weekly, bi-weekly, monthly, etc.), the randomly generated check-ins are re-randomized within each set random check-in period for each successive schedule cycle. In addition, or as an alternative, the monitor may also select an on-demand check-in, reflecting a desire to schedule an immediate check-in (or as closely thereto as practical). In some cases, such on-demand check-ins are not recycled to the next schedule cycle, but are implemented once and discarded.

Additionally, for each scheduled check-in, there may exist a check-in window (i.e., a period of time from the inception of the check-in period during which the scheduled check-in can be taken by the user before the check-in is considered missed by the system). The monitor may set up check-in windows for each time in the check-in schedule or may set up a single check in window that is used in relation with all times in the check-in schedule (block 210). The check-in window may be a default check-in window, or may be generated or otherwise modified by the monitor, preferably via the server supported website. The monitor may select from a plurality of predetermined options for the check-in window, including, for example, thirty (30) minutes, sixty (60) minutes, one hundred twenty (120) minutes, one hundred eighty (180) minutes, two hundred forty (240) minutes, or custom duration check-in windows. In some embodiments, the monitor may assign unique check-in windows to the check-in periods. In some embodiments, the check-in window may not exceed a predetermined duration.

Once the check-in schedule and check-in window(s) are received, any conflicts or overlaps between check-in times and windows are identified (block 215). For example, if check-in periods are scheduled for every other hour of the day with check-in windows of one hundred eighty (180) minutes, then successive check-in periods would overlap with the check-in windows of the prior check-in period. This is an undesirable result, as it may encourage users to perform a single check-in or two check-ins close in time during the overlapping period, so as to provide the individual being monitored more time before the next scheduled check-in in which to go out-of-bounds. This undesirable result may also occur even with where check-in periods abut or are very close without actually overlapping. Consequently, in some embodiments, a conflict may be identified where there is an insufficient buffer period between scheduled check-ins such that the temptation for the individual being monitored to go out-of-bounds is not sufficiently mitigated.

It is determined whether there are any conflicts represented in the check-in times and windows (block 220). Where one or more conflicts are identified (block 220), one or more of the check-in times or check-in windows are modified to resolve the identified conflict(s) (block 225). This conflict resolution may be done automatically or under direction of the monitor. The selected schedule is then uploaded from the remote monitor station to the user detached monitoring device (block 230).

During operation of the user detached monitoring device it is determined whether the schedule indicates a check-in time (block 235). Where a check-in time is indicated (block 235), the individual being monitored (i.e., the expected user of the user detached monitoring device) is alerted of the check-in requirement (block 240). This may be done using one or more of a speaker, vibrator, or visual display included in the user detached monitoring device. The alert may include instructions indicating to the individual being monitored a time limit for checking in and what identification information from the individual being monitored is to be provided as part of the check-in. For example, the alert may indicate that the individual being monitored has thirty (30) minutes to check-in and must take a picture of their face using the camera in the user detached monitoring device. As another example, the alert may indicate that the individual being monitored has twenty (20) minutes to check-in and must take a thumb print using the biometric circuitry included in the user detached monitoring device. As yet another example, the alert may indicate that the individual being monitored has one hour to record a message included in the alert using the microphone in the user detached monitoring device. As yet another example, the alert may indicate that the individual being monitored has twenty (20) minutes to both record a message included in the alert using the microphone in the user detached monitoring device and take a face shot using the camera included in the user detached monitoring device.

It is determined whether the required check-in information was received from the user detached monitoring device within the expected window of time (block 245). If the required information is not received (block 245), a check-in failure is indicated (block 250). When such a check-in failure is indicated, a message is sent from the user detached monitoring device to the remote monitoring station that includes recent location information for the user detached monitoring device and an indication of the check-in failure. Alternatively, if the required information is received (block 245), a check-in success is indicated (block 255). When such a check-in success is indicated, a message is sent from the user detached monitoring device to the remote monitoring station that includes recent location information for the user detached monitoring device and the gathered user identification information (i.e., a subset of the required check-in information).

In some cases, all data gathered by the user detached monitoring device is time stamped. Such time stamp data may be generated from a clock in association with the administered check-in. The timestamp data reflects the time and/or date in which the check-in was administered, and may be transmitted to the remote monitoring system in association with the check-in. In some embodiments, the remote monitoring system operates according to a default time (e.g., coordinated universal time or UTC time) while the location monitoring device operates according to the clock time of the user detached monitor device. In some embodiments, during a period of connectivity, the clock time of the user detached monitor device may be reset to match the default time. In such circumstances, any time stamp data transmitted prior to the reset may be prorated to generate a modified timestamp reflecting the date/time of the administered check-in according to the default time. For example, when a periodic check-in occurs and it is determined that the clock time is, for example, five (5) seconds behind the default time, the timestamp data for the associated check-in transmitted at the check-in is modified by that five (5) second discrepancy to reflect the time of the administered check-in according to the default time. In this manner, the timestamp data for each administered check-in stored by the monitoring station is according to a uniform date/time standard (e.g., according to the default time).

The location and user identification information provided by the user detached monitoring device to the remote monitoring system may be utilized by the remote monitoring system to generate one or more reports. Such reports may include the data from one or more check-ins. In some cases, other data in addition to the check-in data is included in the reports. In some embodiments, the reports are generated automatically at specified intervals (e.g., daily, weekly, monthly, or per check-in). The generated reports may be accessed by the monitor via the user interaction system or an interactive web portal to the server supported website, whereby the monitor may review one or more reports online. In some embodiments, the generated reports may be emailed or text messaged to the email account or cellular phone of the monitor, respectively. In some embodiments, the generated reports may also be provided to the individual being monitored. Such updates to the individual being monitored may be made via email or text, or as a post on a social media account accessed by the individual being monitored.

In some embodiments, the system provides a text-message opt-in option. When, through registration, a mobile number is added or updated on the website, the system identifies if the number has previously been blacklisted or confirmed. If it has not been either, the system texts an invitation to that number to opt-in to receive text-message alerts and/or reports. If the monitor and/or individual being monitored responds to the invite with a "SUBSCRIBE" response, the number is marked as confirmed and from that point forward is able to receive text messages from the system. At any time, the monitor and/or individual being monitored may text "STOP" to unsubscribe.

The web portal may contain functionality allowing the monitor to: add/delete/edit monitor contact information; select for each monitor contact the circumstances (e.g. missed/failed check-ins, daily, weekly, monthly) and methods (e.g. text or email) in which the monitor will receive automated reports and/or alerts. Each of these functionalities, as well as the functionalities of other web portals may be implemented in part or in whole via monitor/user fillable fields, drop down menus and/or selectable icons.

As discussed herein, the generated reports may include more or less information than what is described herein, but which is nonetheless apparent to one of ordinary skill in the art as desirable for effective monitoring. Accordingly, in some embodiments, the generated report may comprise an alert, which is a report with limited information transmitted to the monitor so that the monitor may be apprised of an important event such as a missed/failed check-in. The alert, for example, may include a text message that identifies the individual being monitored and the important event. Upon receiving the alert, the monitor may access the monitoring station (e.g. the server supported website) and review the generated report having all the requested information. As with the previously described reports, it is contemplated that the monitor may customize his/her preferences regarding the alerts not only with regards to the information provided, but as to how the alerts are transmitted and/or displayed.

In some circumstances, the monitor may be responsible for monitoring a plurality of individuals being monitored. In such circumstances, the teachings described herein are applicable to the plurality of individuals being monitored. Further, the generated report may be a combined report, viewable via the server supported website, containing hyperlinks or other access to the reports of each individual being monitored.

Figure 3:
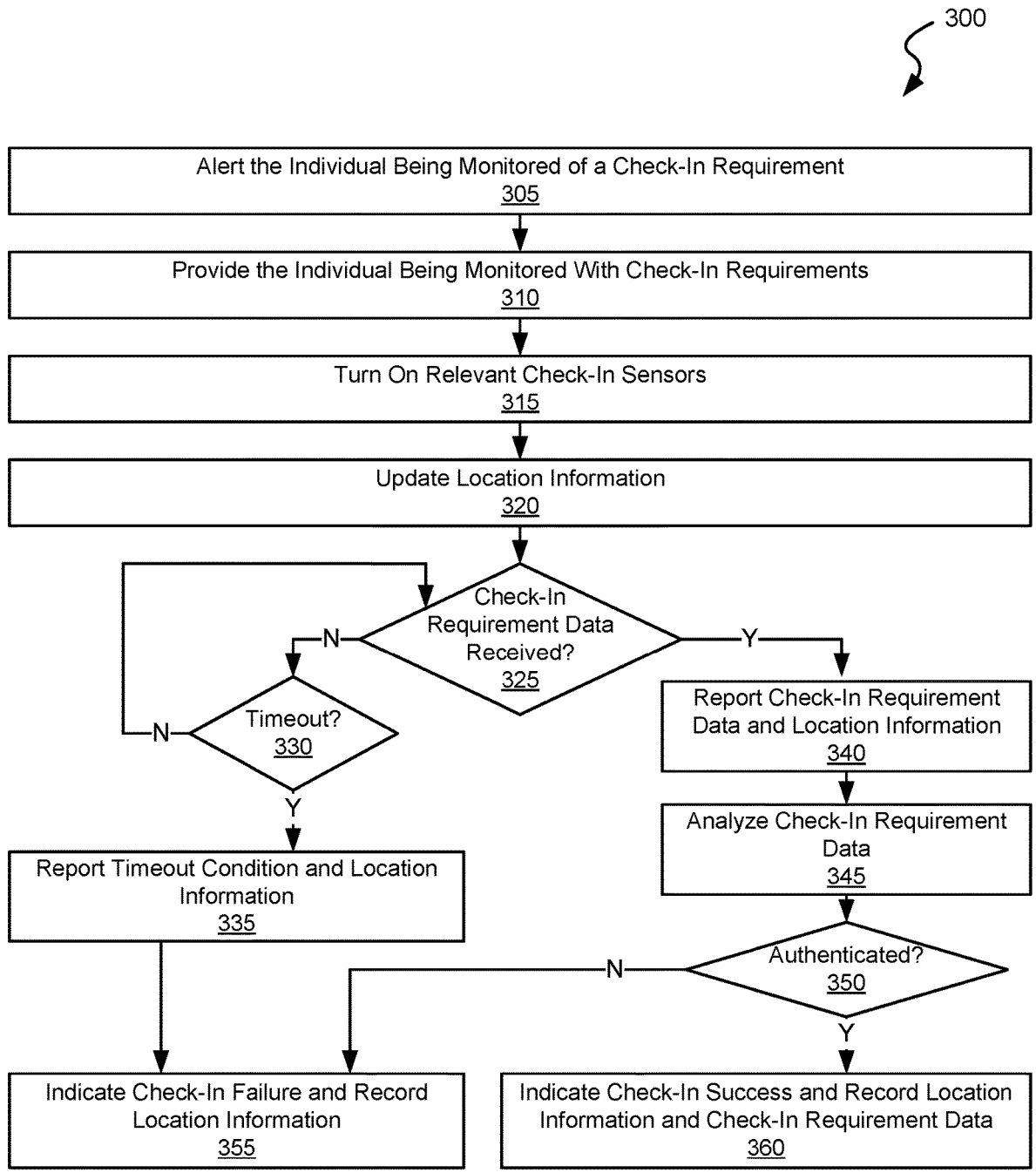
FIG. 3 is a flow diagram showing a method in accordance with some embodiments for interaction between a user detached monitoring device and a remote monitoring station including ambiguity reduction check-in processes.

Turning to FIG. 3, a flow diagram 300 shows a method for interaction between a user detached monitoring device and a remote monitoring station including ambiguity reduction check-in processes in accordance with various embodiments. Following flow diagram 300, a individual being monitored is alerted of a check-in requirement (block 305). This alert may be generated locally by a user detached monitoring device based upon a previously downloaded schedule. This alert may be done using one or more of a speaker, vibrator, or visual display included in the user detached monitoring device. In addition, the user is notified of the check-in requirements (block 310). The alert may include instructions indicating to the individual being monitored a time limit for checking in and what identification information for the individual being monitored is to be provided as part of the check-in. For example, the alert may indicate that the individual being monitored has thirty (30) minutes to check-in and must take a picture of their face using the camera in the user detached monitoring device. As another example, the alert may indicate that the individual being monitored has twenty (20) minutes to check-in and must take a thumb print using the biometric circuitry included in the user detached monitoring device. As yet another example, the alert may indicate that the individual being monitored has one hour to record a message included in the alert using the microphone in the user detached monitoring device. As yet another example, the alert may indicate that the individual being monitored has one twenty (20) minutes to both record a message included in the alert using the microphone in the user detached monitoring device and take a face shot using the camera included in the user detached monitoring device.

The relevant check-in sensors within the user detached monitoring device are turned on (block 315), and the location information for the user detached monitoring device is updated (block 320). It is determined whether the required check-in information was received by the user detached monitoring device (block 325). If the required information is not received (block 325), it is determined if a timeout condition occurred (block 330). Where the timeout condition has not been met, it is again determined whether the required check-in information was received by the user detached monitoring device (block 325). Where, on the other hand, the timeout condition does occur (block 330), the timeout condition and the location information are transmitted from the user detached monitoring device to the remote monitoring system (block 335). Alternatively, where the required check-in information was received by the user detached monitoring device (block 325), the check-in information and the location information are transmitted from the user detached monitoring device to the remote monitoring system (block 340).

The remote monitoring system performs various processes based upon the received information. In particular, where a timeout condition was reported by the user detached monitoring device (block 335), the remote monitoring system indicates a check-in failure and records the location provided from the user detached monitoring device (block 355). Alternatively, where the required check-in information was received from the user detached monitoring device (block 340), the check-in information is analyzed by the remote monitoring system to determine whether it is authentic (block 345). This may include, for example, comparing a face picture of the individual being monitored received as part of the identification information with a reference photo of the individual being monitored maintained in the remote monitoring system using facial recognition software. As another example, this may include comparing a thumb print received as the identification information with a reference thumb print maintained in remote monitoring system.

Based upon the aforementioned analysis (block 345), it is determined whether the individual providing the identification information via user detached monitoring device is the individual being monitored expected to be associated with the device (i.e., the target of the monitoring) (block 350). Where the individual being monitored is authenticated as the expected individual being monitored (block 350), the remote monitoring system indicates a check-in success and records the location information and identification received as part of the check-in (block 360). Alternatively, where the individual being monitored is not authenticated as the expected individual being monitored (block 350), the remote monitoring system indicates a check-in failure and records the location provided from the user detached monitoring device (block 355).

Some embodiments implement the user detached monitoring device as part of a smart phone or other personal smart device, such as a PDA or the like. In such a system, a schedule is created according to which the check-ins are to be administered. As detailed above, the schedule may be generated and/or stored by the server system based on input provided by the monitor. Reference data is provided to the remote monitoring system by one or more of the monitor, the individual being monitored, and the user detached monitoring device. The reference data may include reference identification information data against which to compare check-in associated identification information data. For example, the reference identification information data may include an image of the individual being monitored against which facial recognition software may be used to compare check-in image data of the individual being monitored. For example, the reference identification information data may include a reference thumb print or other reference biometric data against which to compare the check-in associated identification information data. The reference data may further include reference location data against which to compare check-in associated location data to determine whether the individual being monitored is out-of-bounds. The reference location data may be, for example, a defined distance vector (e.g., a predetermined radius) from a geographic location—and out-of-bounds may be defined as either within or without the distance vector. The reference data is retrievably stored by the monitoring station, which utilizes it as described herein to compare against check-in associated data, thereby determining the appropriate check-in result (e.g., missed, failed, passed).

Subsequently, the schedule may be accessed by the monitoring device so as to prompt the individual being monitored to initiate scheduled check-ins. The schedule may consist of predetermined check-in periods, random check-in periods, and/or on-demand check-in periods. For example, a bump reminder may appear on the smart phone of the individual being monitored prompting the scheduled check-in.

In response to the schedule, the individual being monitored of the user detached monitoring device administers the check-in. This occurs by the individual being monitored engaging the identification information sensor(s) so as to generate the identification information data. For example, for a retinal scan or facial recognition sensing, the individual being monitored may orient the smart phone camera to capture his/her eye or face. For example, for a thumbprint or other biometric scan, the individual being monitored may place his thumbprint onto the touch-screen of the smart phone to be read thereby.

The location data is more or less contemporaneously generated with the identification information data so as to guard against forgery. In some embodiments, the identification information data generation may require that the individual being monitored hold the engagement of the identification information sensor (e.g., hold his/her thumb in place, or hold the camera focused on his/her face) for a predetermined period while the location data is being generated.

Once generated, the location data and the identification information data are transmitted from the user detached monitoring device to the remote monitoring system in accordance with the schedule, as described above. When the data associated with the scheduled check-in is not received by the remote monitoring system in accordance with the schedule, the scheduled check-in may be associated with a 'missed' result. When the data associated with the scheduled check-in fails to match the reference data, the scheduled check-in may be associated with a 'failed' result.

The location and/or identification information data and/or results may be utilized by the system to generate one or more reports based thereon. Such reports may include the data (and other data) from one or more administered and/or scheduled check-ins. The generated reports may be accessed by the monitor via the interactive web portal to the server supported website, whereby the monitor may review one or more reports online. In some embodiments, the generated reports may be e-mailed or text messaged to the e-mail account or cellular phone of the monitor, respectively.

Additional details of the aforementioned features and others in the context of sobriety monitoring may be found in U.S. Pat. No. 8,707,758, issued on Apr. 29, 2014; U.S. Pat. No. 8,381,573, issued on Sep. 15, 2010; and U.S. application Ser. No. 13/274,553, filed on Oct. 17, 2011, the disclosures and contents of which are herein incorporated by reference in their entirety. Additional details of these features and others may also be found in the figures filed herewith, the entire disclosure and contents of which is herein incorporated by reference in its entirety.

Figure 4:
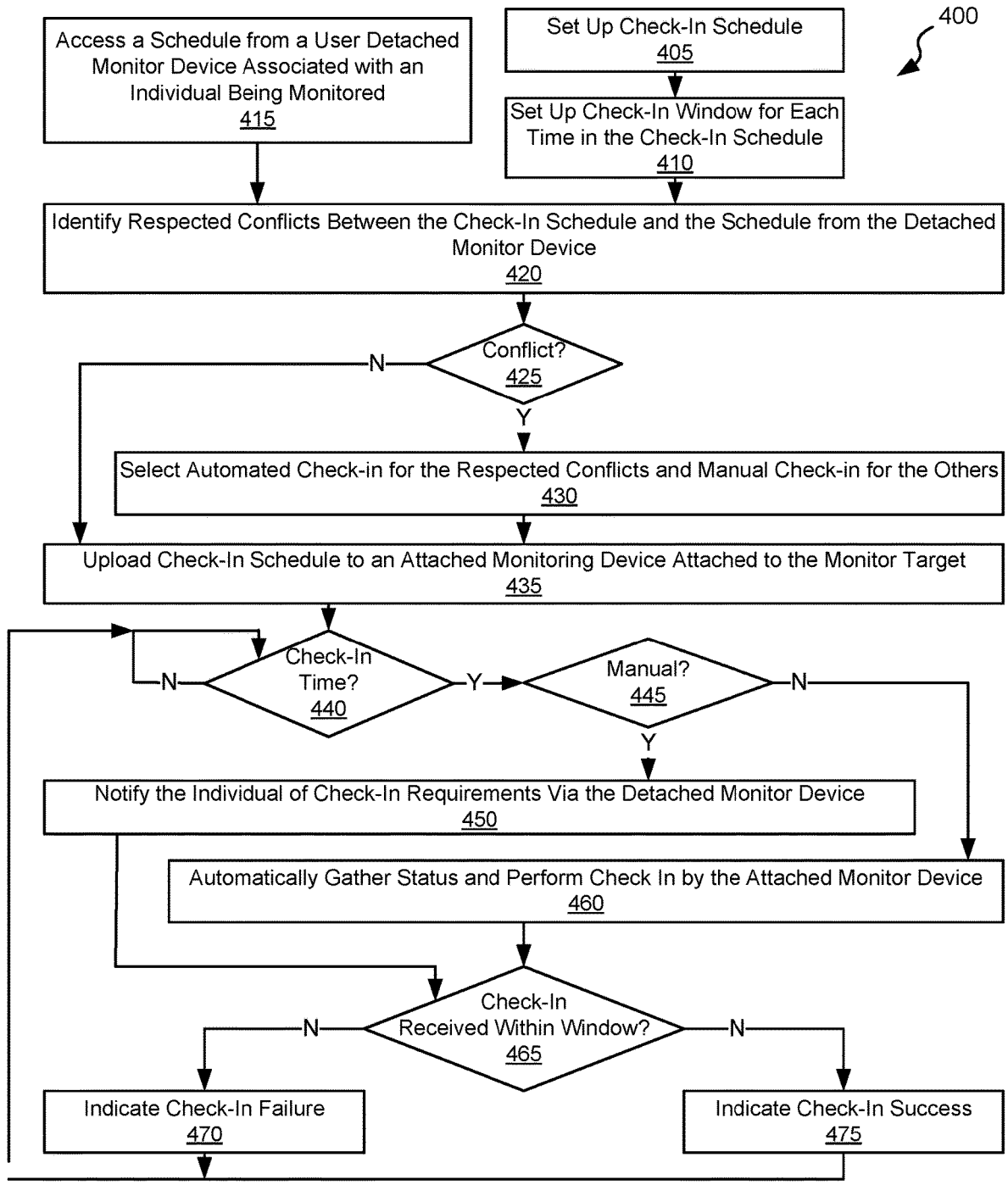
FIG. 4 is a flow diagram showing a method in accordance with some embodiments for interaction between a user detached monitoring device and a remote monitoring station including scheduling and check-in processes using data accessed from a user detached monitor device and including use of a user attached monitor device to provide automatic updates.

Turning to FIG. 4, a flow diagram 400 shows a method in accordance with some embodiments for interaction between a user detached monitoring device and a remote monitoring station. The method includes scheduling and check-in processes using data accessed from a user detached monitor device and use of a user attached monitor device to provide automatic updates. Following flow diagram 400, a check-in schedule is set up by a monitor accessing the system via a user interaction device (block 405). Such a user interaction device may be, but is not limited to, a network connected user interface device communicatively coupled via a network to a remote monitoring system and/or directly to a user detached monitor device via a wireless communication network. As just some examples, the user interaction device may be a mobile phone, a mobile computer, or a fixed computer station. Based upon the disclosure provided herein one of ordinary skill in the art will recognize a variety of user interaction devices that may be used in relation to different embodiments.

The check-in schedule may consist of predetermined check-in periods, random check-in periods, and/or on-demand check-in periods. The monitor sets a predetermined check-in period by selecting a single date/time option for the check-in to occur. The monitor may set multiple predetermined check-in periods by selecting a plurality of single dates/times for the check-in to occur. The monitor sets a random check-in period by selecting a continuous range of date/time options that reflect the temporal bounds within which the monitor desires the check-in to randomly occur, and additionally selects the number of check-ins the monitor desires to be taken during the random check-in period. As the selection consists of a range that may be resized or otherwise tailored according to the preference of the monitor. The server system then randomly schedules the desired number of check-in to occur during the set random check-in period. Preferably, if the generated schedule is a periodic schedule (e.g. weekly, bi-weekly, monthly, etc.), the randomly generated check-ins are re-randomized within each set random check-in period for each successive schedule cycle. In addition, or as an alternative, the monitor may also select an on-demand check-in, reflecting a desire to schedule an immediate check-in (or as closely thereto as practical). In some cases, such on-demand check-ins are not recycled to the next schedule cycle, but are implemented once and discarded.

Additionally, for each scheduled check-in, there may exist a check-in window (i.e., a period of time from the inception of the check-in period during which the scheduled check-in can be taken by the user before the check-in is considered missed by the system). The monitor may set up check-in windows for each time in the check-in schedule or may set up a single check in window that is used in relation with all times in the check-in schedule (block 410). The check-in window may be a default check-in window, or may be generated or otherwise modified by the monitor, preferably via the server supported website. The monitor may select from a plurality of predetermined options for the check-in window, including, for example, thirty (30) minutes, sixty (60) minutes, one hundred twenty (120) minutes, one hundred eighty (180) minutes, two hundred forty (240) minutes, or custom duration check-in windows. In some embodiments, the monitor may assign unique check-in windows to the check-in periods. In some embodiments, the check-in window may not exceed a predetermined duration.

In parallel, a schedule is accessed from a user detached monitor device by a remote monitor station (block 415). The accessed schedule is under control of the individual being monitored and possibly represents a schedule that the individual envisions following. One of the struggles with introducing an offender back into society is getting that individual to take control of their lives and to perform activities on a schedule dictated by them. The individual is trained to begin directing their life, and to design and keep to a schedule. By using the individual's schedule as part of designing a monitoring program, any monitoring performed can be used to reinforce the schedule. The schedule is compared with the check-in schedule to determine whether there are any conflicts that the monitor desires to respect (block 420). For example, a monitor may respect an individual's time at work, but may not respect an individual's planned workout time. Based upon the disclosure provided herein, one of ordinary skill in the art will recognize a variety of scheduled events that may be respected and others that are not respected.

It is determined whether there are any respected conflicts represented in the check-in times and windows (block 425). Where one or more respected conflicts are identified (block 425), an automated check-in using the user attached monitor device is selected for the respective check-in times and a manual check-in using the user detached monitor device is selected for the other check-in times (block 430). The schedule including manual check-in times is uploaded from the remote monitor station to the user detached monitoring device, and the schedule including automated check in times is uploaded to the user attached monitor device (block 435).

During operation, it is determined whether the schedule indicates a check-in time (block 440). Where the scheduled check-in was uploaded to the user detached monitor device it is identified as a manual check-in (block 445) and the individual being monitored (i.e., the expected user of the user detached monitoring device) is alerted of the check-in requirements (block 450). This may be done using one or more of a speaker, vibrator, or visual display included in the user detached monitoring device. The alert may include instructions indicating to the individual being monitored a time limit for checking in and what identification information from the individual being monitored is to be provided as part of the check-in. For example, the alert may indicate that the individual being monitored has thirty (30) minutes to check-in and must take a picture of their face using the camera in the user detached monitoring device. As another example, the alert may indicate that the individual being monitored has twenty (20) minutes to check-in and must take a thumb print using the biometric circuitry included in the user detached monitoring device. As yet another example, the alert may indicate that the individual being monitored has one hour to record a message included in the alert using the microphone in the user detached monitoring device. As yet another example, the alert may indicate that the individual being monitored has twenty (20) minutes to both record a message included in the alert using the microphone in the user detached monitoring device and take a face shot using the camera included in the user detached monitoring device.

Alternatively, where the scheduled check-in was uploaded to the user attached monitor device it is identified as an automatic check-in (i.e., not a manual check-in) (block 445) and the user attached monitor device automatically gathers status and performs the check-in process without involving the individual being monitored (block 460). The status may include, but is not limited to, a time stamp, a location of the user attached monitor device, and/or whether the user attached monitor device is within communication range of the user detached monitor device. Determining whether the user attached monitor device is within communication range of the user detached monitor device may be done, for example, by sending a communication between the user detached monitor device and the user attached monitor device that allows one or both of the devices to know that the other is within communication proximity. In some cases, this may be done by the user attached monitor device sending a Bluetooth™ request to the user attached monitor device and awaiting a response. Upon receiving the request, the user detached monitor device knows it is within proximity of the user attached monitor device. Upon receiving the response, the user attached monitor device knows it is within proximity of the user detached monitor device. Based upon the disclosure provided herein, one of ordinary skill in the art will recognize a variety of processes and/or communication protocols that may be used in relation to different embodiments to discern device proximity. Further, based upon the disclosure provided herein, one of ordinary skill in the art will recognize a variety of status that can be gathered by the user attached monitor device without involving the individual being monitored.

It is determined whether the required check-in information was received from the user detached monitoring device or the user attached monitoring device by the remote monitoring station within the expected window of time (block 465). If the required information is not received (block 465), a check-in failure is indicated (block 470). When such a check-in failure is indicated, a message is sent from the user detached monitoring device to the remote monitoring station that includes recent location information for the user detached monitoring device and an indication of the check-in failure. Alternatively, if the required information is received (block 465), a check-in success is indicated (block 475). When such a check-in success is indicated, a message is sent from the user detached monitoring device to the remote monitoring station that includes recent location information for the user detached monitoring device and the gathered user identification information (i.e., a subset of the required check-in information). Time stamping and report generation may be done similar to that discussed above in relation to FIG. 2.

Figure 5:
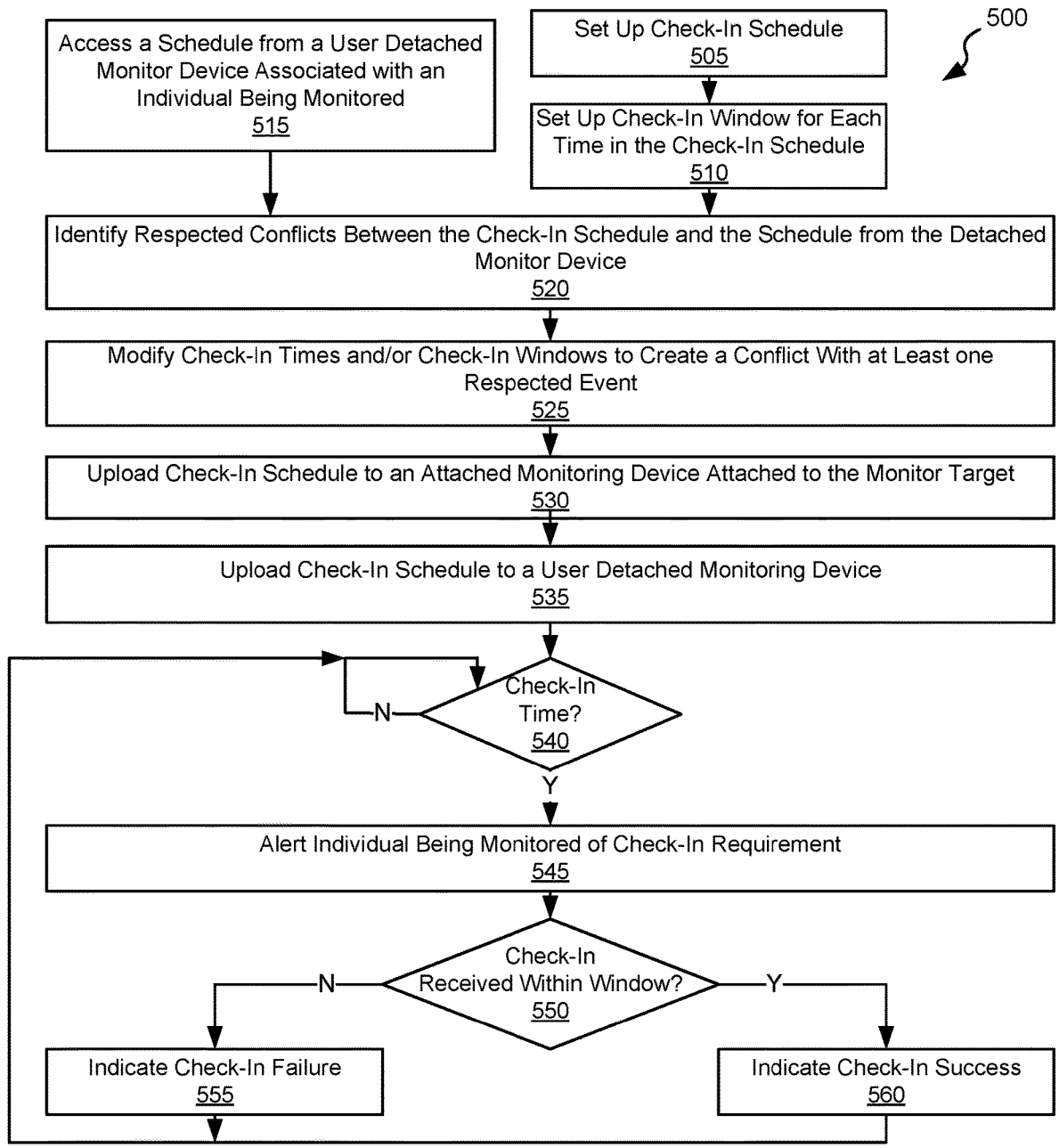
FIG. 5 is a flow diagram showing a method in accordance with some embodiments for interaction between a user detached monitoring device and a remote monitoring station including scheduling and check-in processes using data accessed from a user detached monitor device where a conflict is purposely created with a schedule accessed from the user detached monitor device.

Turning to FIG. 5, a flow diagram 500 shows a method in accordance with some embodiments for interaction between a user detached monitoring device and a remote monitoring station including scheduling and check-in processes using data accessed from a user detached monitor device. In the method, a conflict is purposely created with a schedule accessed from the user detached monitor device. Following flow diagram 500, a check-in schedule is set up by a monitor accessing the system via a user interaction device (block 505). Such a user interaction device may be, but is not limited to, a network connected user interface device communicatively coupled via a network to a remote monitoring system and/or directly to a user detached monitor device via a wireless communication network. As just some examples, the user interaction device may be a mobile phone, a mobile computer, or a fixed computer station. Based upon the disclosure provided herein one of ordinary skill in the art will recognize a variety of user interaction devices that may be used in relation to different embodiments.

The check-in schedule may consist of predetermined check-in periods, random check-in periods, and/or on-demand check-in periods. The monitor sets a predetermined check-in period by selecting a single date/time option for the check-in to occur. The monitor may set multiple predetermined check-in periods by selecting a plurality of single dates/times for the check-in to occur. The monitor sets a random check-in period by selecting a continuous range of date/time options that reflect the temporal bounds within which the monitor desires the check-in to randomly occur, and additionally selects the number of check-ins the monitor desires to be taken during the random check-in period. As the selection consists of a range that may be resized or otherwise tailored according to the preference of the monitor. The server system then randomly schedules the desired number of check-in to occur during the set random check-in period. Preferably, if the generated schedule is a periodic schedule (e.g. weekly, bi-weekly, monthly, etc.), the randomly generated check-ins are re-randomized within each set random check-in period for each successive schedule cycle. In addition, or as an alternative, the monitor may also select an on-demand check-in, reflecting a desire to schedule an immediate check-in (or as closely thereto as practical). In some cases, such on-demand check-ins are not recycled to the next schedule cycle, but are implemented once and discarded.

Additionally, for each scheduled check-in, there may exist a check-in window (i.e., a period of time from the inception of the check-in period during which the scheduled check-in can be taken by the user before the check-in is considered missed by the system). The monitor may set up check-in windows for each time in the check-in schedule or may set up a single check in window that is used in relation with all times in the check-in schedule (block 510). The check-in window may be a default check-in window, or may be generated or otherwise modified by the monitor, preferably via the server supported website. The monitor may select from a plurality of predetermined options for the check-in window, including, for example, thirty (30) minutes, sixty (60) minutes, one hundred twenty (120) minutes, one hundred eighty (180) minutes, two hundred forty (240) minutes, or custom duration check-in windows. In some embodiments, the monitor may assign unique check-in windows to the check-in periods. In some embodiments, the check-in window may not exceed a predetermined duration.

In parallel, a schedule is accessed from a user detached monitor device by a remote monitor station (block 515). The accessed schedule is under control of the individual being monitored and possibly represents a schedule that the individual envisions following. One of the struggles with introducing an offender back into society is getting that individual to take control of their lives and to perform activities on a schedule dictated by them. The individual is trained to begin directing their life, and to design and keep to a schedule. By using the individual's schedule as part of designing a monitoring program, any monitoring performed can be used to reinforce the schedule. The schedule is compared with the check-in schedule to determine whether there are any conflicts that the monitor desires to respect (block 520). For example, a monitor may respect an individual's time at work, but may not respect an individual's planned workout time or an individual's social calendar. Based upon the disclosure provided herein, one of ordinary skill in the art will recognize a variety of scheduled events that may be respected and others that are not respected.

The monitor may then adjust the check-in schedule and/or check-in windows create a conflict with non-respected scheduled events (block 525). This modified check-in schedule to the user attached monitoring device (block 530). This modified check-in schedule including check-in windows is uploaded from the remote monitor station to the user detached monitoring device (block 535).

During operation of the user detached monitoring device it is determined whether the schedule indicates a check-in time (block 540). Where a check-in time is indicated (block 540), the individual being monitored (i.e., the expected user of the user detached monitoring device) is alerted of the check-in requirement (block 545). This may be done using one or more of a speaker, vibrator, or visual display included in the user detached monitoring device. The alert may include instructions indicating to the individual being monitored a time limit for checking in and what identification information from the individual being monitored is to be provided as part of the check-in. For example, the alert may indicate that the individual being monitored has thirty (30) minutes to check-in and must take a picture of their face using the camera in the user detached monitoring device. As another example, the alert may indicate that the individual being monitored has twenty (20) minutes to check-in and must take a thumb print using the biometric circuitry included in the user detached monitoring device. As yet another example, the alert may indicate that the individual being monitored has one hour to record a message included in the alert using the microphone in the user detached monitoring device. As yet another example, the alert may indicate that the individual being monitored has twenty (20) minutes to both record a message included in the alert using the microphone in the user detached monitoring device and take a face shot using the camera included in the user detached monitoring device.

It is determined whether the required check-in information was received from the user detached monitoring device within the expected window of time (block 550). If the required information is not received (block 550), a check-in failure is indicated (block 555). When such a check-in failure is indicated, a message is sent from the user detached monitoring device to the remote monitoring station that includes recent location information for the user detached monitoring device and an indication of the check-in failure. Alternatively, if the required information is received (block 550), a check-in success is indicated (block 560). When such a check-in success is indicated, a message is sent from the user detached monitoring device to the remote monitoring station that includes recent location information for the user detached monitoring device and the gathered user identification information (i.e., a subset of the required check-in information). By allowing a monitor to create purposeful conflicts with a schedule of the individual being monitored, a check-in demand occurring during the scheduled event may serve as a gentle reminder to the individual being monitored to be careful while engaged in the scheduled event.

Figure 6:
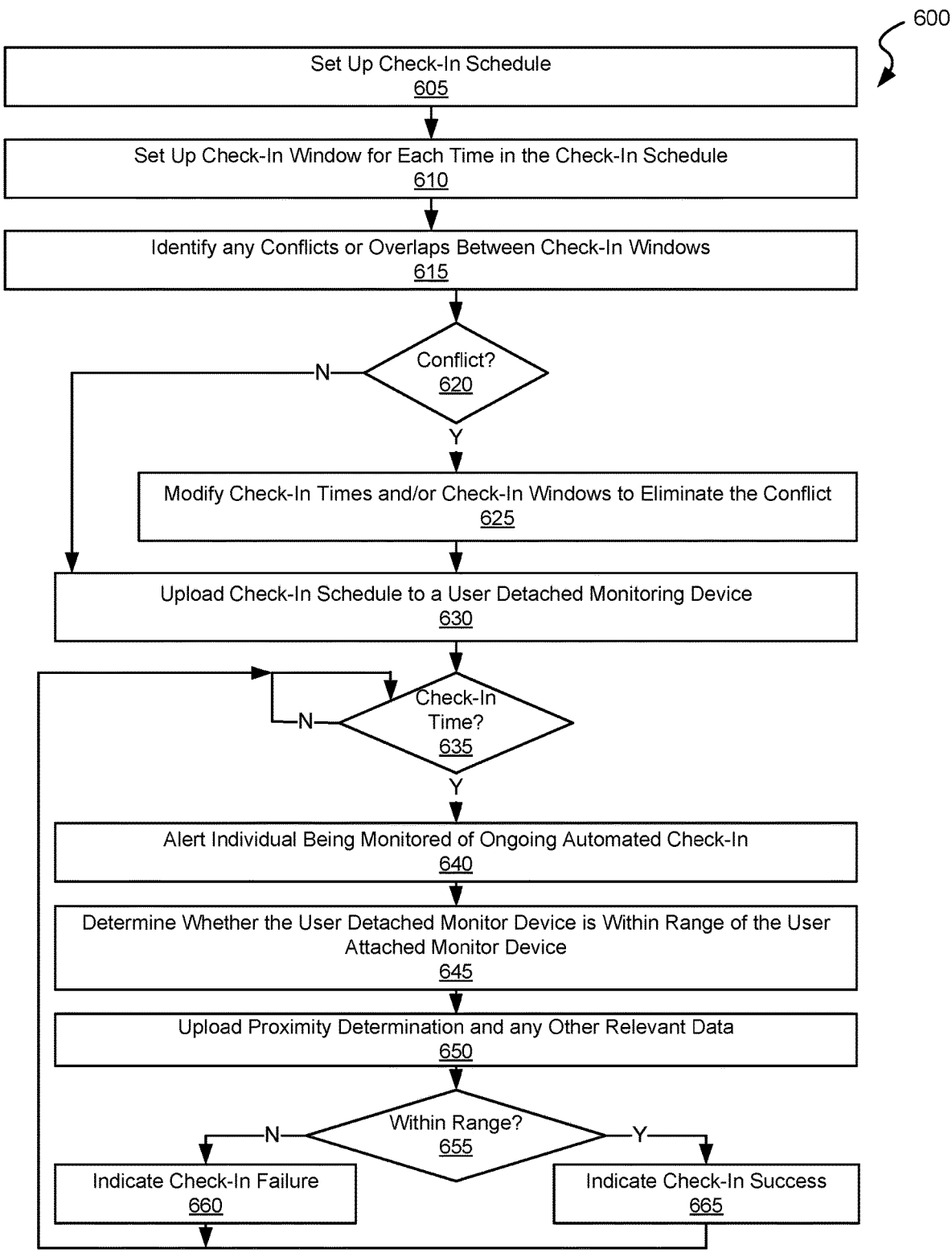
FIG. 6 is a flow diagram showing a method in accordance with some embodiments for interaction between a user detached monitoring device and both a remote monitoring station and a user attached monitoring device including scheduling and check-in processes.

Turning to FIG. 6, a flow diagram 600 shows a method for interaction between a user detached monitoring device and both a remote monitoring station and a user attached monitor device including scheduling and check-in processes in accordance with some embodiments. Such a user detached monitor device may be, for example, similar to the user detached monitor device discussed above in relation to FIG. 1*b*. As another example, the user detached monitor device may be a mobile phone including one or more applications allowing operation of the method. Based upon the disclosure provided herein, one of ordinary skill in the art will recognize a variety of user detached monitor devices that may be used in relation to different embodiments. The user attached monitor device may be, for example, similar to the user detached monitor device discussed above in relation to FIG. 1*c*. Based upon the disclosure provided herein, one of ordinary skill in the art will recognize a variety of user attached monitor devices that may be used in relation to different embodiments. The monitor may be any individual or automated machine capable of setting a schedule for an individual subject to the monitoring. As one example, a monitor may be a parole officer. Based upon the disclosure provided herein, one of ordinary skill in the art will recognize a variety of monitors that may operate in relation to different embodiments.

Following flow diagram 600, a check-in schedule is set up by a monitor accessing the system via a user interaction device (block 605). Such a user interaction device may be, but is not limited to, a network connected user interface device communicatively coupled via a network to a remote monitoring system and/or directly to a user detached monitor device via a wireless communication network. As just some examples, the user interaction device may be a mobile phone, a mobile computer, or a fixed computer station. Based upon the disclosure provided herein one of ordinary skill in the art will recognize a variety of user interaction devices that may be used in relation to different embodiments.

The check-in schedule may consist of predetermined check-in periods, random check-in periods, and/or on-demand check-in periods. The monitor sets a predetermined check-in period by selecting a single date/time option for the check-in to occur. The monitor may set multiple predetermined check-in periods by selecting a plurality of single dates/times for the check-in to occur. The monitor sets a random check-in period by selecting a continuous range of date/time options that reflect the temporal bounds within which the monitor desires the check-in to randomly occur, and additionally selects the number of check-ins the monitor desires to be taken during the random check-in period. As the selection consists of a range that may be resized or otherwise tailored according to the preference of the monitor. The server system then randomly schedules the desired number of check-in to occur during the set random check-in period. Preferably, if the generated schedule is a periodic schedule (e.g. weekly, bi-weekly, monthly, etc.), the randomly generated check-ins are re-randomized within each set random check-in period for each successive schedule cycle. In addition, or as an alternative, the monitor may also select an on-demand check-in, reflecting a desire to schedule an immediate check-in (or as closely thereto as practical). In some cases, such on-demand check-ins are not recycled to the next schedule cycle, but are implemented once and discarded.

Additionally, for each scheduled check-in, there may exist a check-in window (i.e., a period of time from the inception of the check-in period during which the scheduled check-in can be taken by the user before the check-in is considered missed by the system). The monitor may set up check-in windows for each time in the check-in schedule or may set up a single check in window that is used in relation with all times in the check-in schedule (block 610). The check-in window may be a default check-in window, or may be generated or otherwise modified by the monitor, preferably via the server supported website. The monitor may select from a plurality of predetermined options for the check-in window, including, for example, thirty (30) minutes, sixty (60) minutes, one hundred twenty (120) minutes, one hundred eighty (180) minutes, two hundred forty (240) minutes, or custom duration check-in windows. In some embodiments, the monitor may assign unique check-in windows to the check-in periods. In some embodiments, the check-in window may not exceed a predetermined duration.

Once the check-in schedule and check-in window(s) are received, any conflicts or overlaps between check-in times and windows are identified (block 615). For example, if check-in periods are scheduled for every other hour of the day with check-in windows of one hundred eighty (180) minutes, then successive check-in periods would overlap with the check-in windows of the prior check-in period. This is an undesirable result, as it may encourage users to perform a single check-in or two check-ins close in time during the overlapping period, so as to provide the individual being monitored more time before the next scheduled check-in in which to go out-of-bounds. This undesirable result may also occur even with where check-in periods abut or are very close without actually overlapping. Consequently, in some embodiments, a conflict may be identified where there is an insufficient buffer period between scheduled check-ins such that the temptation for the individual being monitored to go out-of-bounds is not sufficiently mitigated.

It is determined whether there are any conflicts represented in the check-in times and windows (block 620). Where one or more conflicts are identified (block 620), one or more of the check-in times or check-in windows are modified to resolve the identified conflict(s) (block 625). This conflict resolution may be done automatically or under direction of the monitor. The selected schedule is then uploaded from the remote monitor station to the user detached monitoring device (block 630).

During operation of the user detached monitoring device it is determined whether the schedule indicates a check-in time (block 635). Where a check-in time is indicated (block 635), the individual being monitored (i.e., the expected user of the user detached monitoring device) is alerted of an ongoing automated check-in (block 640). This may be done using one or more of a speaker, vibrator, or visual display included in the user detached monitoring device.

It is determined whether the user detached monitor device is within communication range of the user attached monitor device (block 645). This may be done, for example, by sending a communication between the user detached monitor device and the user attached monitor device that allows one or both of the devices to know that the other is within communication proximity. In some cases, this may be done by the user attached monitor device sending a Bluetooth™ request to the user attached monitor device and awaiting a response. Upon receiving the request, the user detached monitor device knows it is within proximity of the user attached monitor device. Upon receiving the response, the user attached monitor device knows it is within proximity of the user detached monitor device. Based upon the disclosure provided herein, one of ordinary skill in the art will recognize a variety of processes and/or communication protocols that may be used in relation to different embodiments to discern device proximity.

The result of the determination of whether the user detached monitor device is within communication range of the user attached monitor device is uploaded to the remote monitor station along with any other relevant information including, but not limited to, time and location of one or both of the user detached monitor device and/or the user attached monitor device (block 650). Where the user detached monitor device is within communication range of the user attached monitor device (block 655), a successful check-in is indicated (block 665). Otherwise, a check-in failure is indicated (block 660). Time stamping and report generation may be done similar to that discussed above in relation to FIG. 2.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
    a monitoring station including:
        a first communication apparatus configured to communicate with a user detached monitor associated with an individual being monitored via a wireless communication network;

a first computer readable medium, the first computer readable medium including instructions executable by a first processor to:
  receive an original check-in schedule for the individual being monitored, wherein the original check-in schedule includes at least a first check-in time and a first check-in window corresponding to the first check-in time, and a second check-in time and a second check-in window corresponding to the second check-in time;
  identify an internal conflict within the original check-in schedule, wherein the internal conflict occurs where an end of the first check-in window is within a defined time period of a beginning of the second check-in window; and
  modify the original check-in schedule by performing at least one function to yield an implemented check-in schedule, wherein the at least one function includes one or more of:
    removing one of the first check-in time or the second check-in time from the original check-in schedule;
    reducing the first check-in window of the first check-in time in the original check-in schedule; or
    reducing the second check-in window of the second check-in time in the original check-in schedule; and
    uploading at least a portion of the implemented check-in schedule to the user detached monitor; and
the user detached monitor, the user detached monitor including:
  a location determination circuit configured to generate a location of the user detached monitor;
  a sensor configured to receive input from the individual being monitored;
  a second communication apparatus operable to receive at least the portion of the implemented check-in schedule from the monitoring station via the wireless communication network;
  a second computer readable medium including instructions executable by a second processor to:
    alert the individual being monitored of a check-in requirement in accordance with at least the portion of the implemented check-in schedule;
    receive input from the sensor;
    upload the input received from the sensor to the monitoring station as check-in information; and
    transmit a biometric information received from a user attached monitor device to the monitoring station along with the location of the user detached monitor device.

2. The monitoring system of claim 1, wherein the wireless communication network is a cellular telephone network.

3. The monitoring system of claim 1, wherein the instructions that identify the internal conflict with the original check-in schedule include instructions executable by the second processor to:
  access an individual schedule from the user detached monitor; and
  compare the individual schedule with the original check-in schedule.

4. The monitoring system of claim 3, wherein the second computer readable medium further includes instructions executable by the second processor to:
  receive a request for the individual schedule from the monitoring station; and
  provide the individual schedule to the monitoring station in response to the request.

5. The monitoring system of claim 1, wherein the monitoring system further includes a user attached monitor, and wherein the user attached monitor includes:
  an attachment element configured to attach to a limb of the individual being monitored;
  a tamper sensor configured to indicate removal of the user attached monitor from the limb of the individual being monitored;
  a communication circuit operable to:
    receive the at least the portion of the implemented check-in schedule including the check-in time corresponding to the internal conflict; and
    provide status to the monitoring station without interaction with the individual being monitored in accordance with the portion of the implemented check-in schedule.

6. The monitoring system of claim 1, wherein the sensor is selected from a group consisting of: a camera, an audio sensor; a temperature sensor, and a biometric sensor.

7. The monitoring system of claim 1, wherein the sensor is a biometric sensor, and wherein the biometric sensor is selected from a group consisting of: a finger print sensor, and a retinal scan sensor.

8. A monitoring system, the monitoring system comprising:
  a user detached monitor associated with an individual being monitored, wherein the user detached monitor includes:
    a location determination circuit configured to generate a location of the user detached monitor device;
    a sensor configured to receive input from the individual being monitored;
    a communication apparatus operable to receive at least a portion of an implemented check-in schedule from a monitoring station via a wireless communication network, wherein the implemented check-in schedule includes: at least one check-in window and a corresponding check-in time, and a check-in instruction indicating the corresponding check-in time and an action to be performed in relation to the sensor;
    a processor; and
    a computer readable medium including instructions executable by the processor to:
      alert the individual being monitored of a check-in requirement in accordance with the at least portion of the implemented check-in schedule;
      receive input from the sensor;
      upload the input received from the sensor to the monitoring station; and
      transmit the location information;
  a user attached monitor including:
    an attachment element configured to attach to a limb of the individual being monitored;
    a tamper sensor configured to indicate removal of the user attached monitor from the individual being monitored;
    a biometric sensor configured to sense a biometric information of the individual being monitored;
    a communication circuit operable to:
      receive the at least portion of the implemented check-in schedule including the check-in time corresponding to the conflict; and provide status to the monitoring station without interaction with the individual being monitored in accordance with the at least portion of the implemented check-in schedule; and transmit the biometric information.

9. The monitoring system of claim 8, wherein the wireless communication network is a cellular telephone network.

10. The monitoring system of claim 8, wherein the communication apparatus is a first communication apparatus, wherein the computer readable medium is a first computer readable medium, wherein the processor is a first processor, and wherein the monitoring system further includes:

the monitoring station including:
  a second communication apparatus configured to communicate with the user detached monitor via a communication link;
  a second computer readable medium, the second computer readable medium including instructions executable by a second processor to:
    receive an original check-in schedule for the individual being monitored;
    identify a conflict with the original check-in schedule;
    modify the original check-in schedule to change an aspect of the original check-in schedule related to the conflict to yield the implemented check-in schedule;
    upload at least the portion of the implemented check-in schedule to the user detached monitor;
    receive check-in information from the user detached monitor; and
    determine if the check-in information complies with the portion of the implemented check-in schedule.

11. The monitoring system of claim 10, wherein the second computer readable medium further includes instructions executable by the second processor to:
  receive one or more check-in windows associated with two or more check-in times in the original check-in schedule; and
  wherein identifying the conflict with the original check-in schedule includes:
    determining that an end of a check-in window for a first check-in time is within a defined time period of a beginning of a check-in window for a second check-in time; and
    indicating the conflict; and
  wherein modifying the original check-in schedule to change an aspect of the original check-in schedule in an aspect related to the conflict includes one or more of:
    removing one of the first check-in time or the second check-in time from the check-in schedule;
    reducing the check-in window of the first check-in time in the check-in schedule; or
    reducing the check-in window of the second check-in time in the check-in schedule.

12. The monitoring system of claim 10, wherein the instructions that identify the conflict with the original check-in schedule includes instructions executable by the second processor to:
  access an individual schedule from the user detached monitor;
  compare the individual schedule with the original check-in schedule, wherein the conflict is found where it is determined that an event in the individual schedule overlaps an event in the original check-in schedule; and
  wherein modifying the original check-in schedule to change an aspect of the original check-in schedule related to the conflict includes removing the check-in time corresponding to the conflict to yield the implemented check-in schedule.

13. The monitoring system of claim 12, wherein the first computer readable medium further includes instructions executable by the first processor to:
  receive a request for the individual schedule from the monitoring station; and
  provide the individual schedule to the monitoring station in response to the request.

14. The monitoring system of claim 8, wherein the sensor is selected from a group consisting of: a camera, an audio sensor; a temperature sensor, and a biometric sensor.

15. The monitoring system of claim 8, wherein the sensor is a biometric sensor, and wherein the biometric sensor is selected from a group consisting of: a finger print sensor, and a retinal scan sensor.

* * * * *